June 6, 1967  B. D. MONTGOMERY  3,323,328
TORQUE LIMITING CLUTCH
Filed Nov. 13, 1964  2 Sheets-Sheet 1
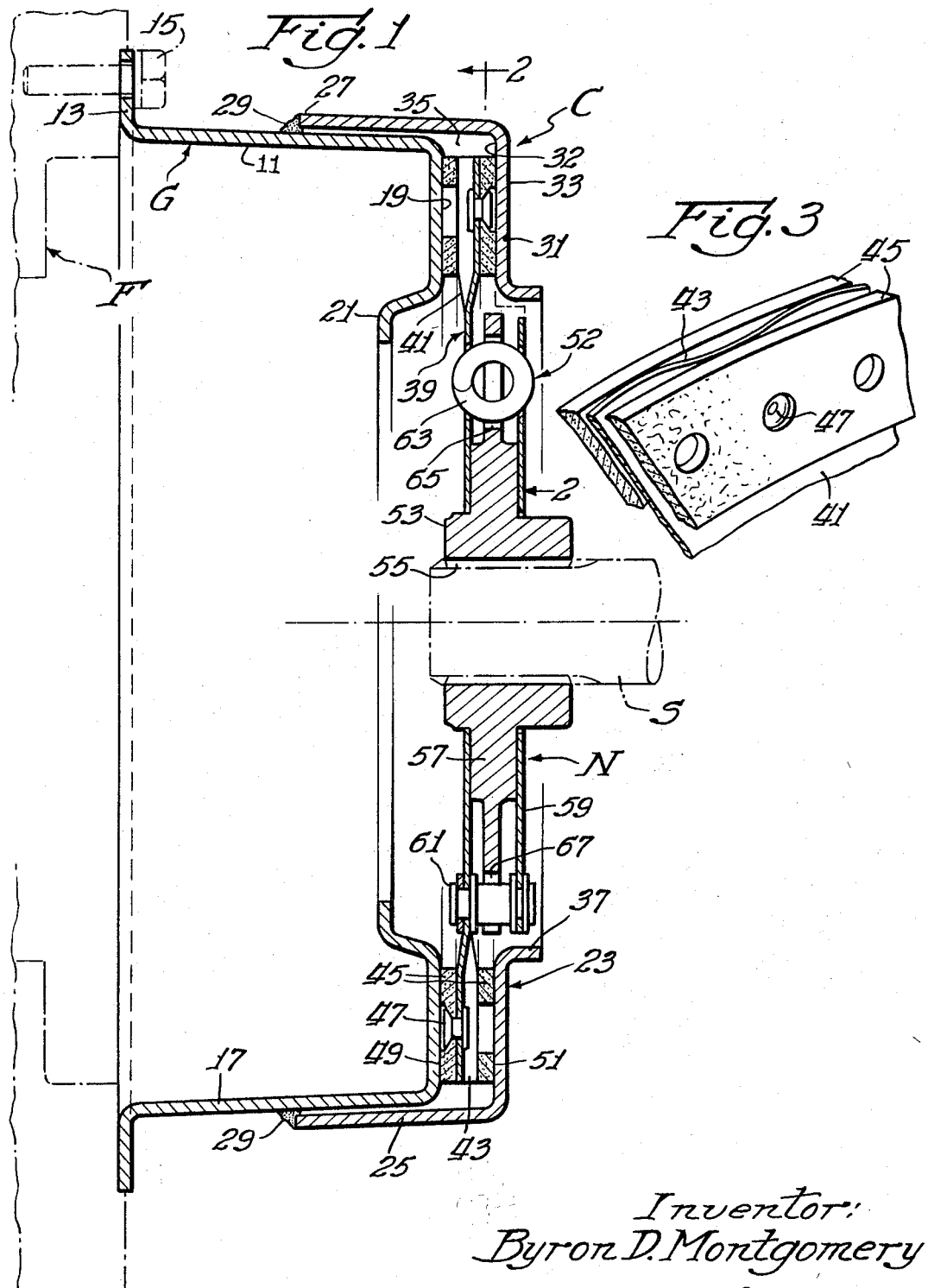
Inventor:
Byron D. Montgomery June 6, 1967   B. D. MONTGOMERY   3,323,328
TORQUE LIMITING CLUTCH
Filed Nov. 13, 1964   2 Sheets-Sheet 2
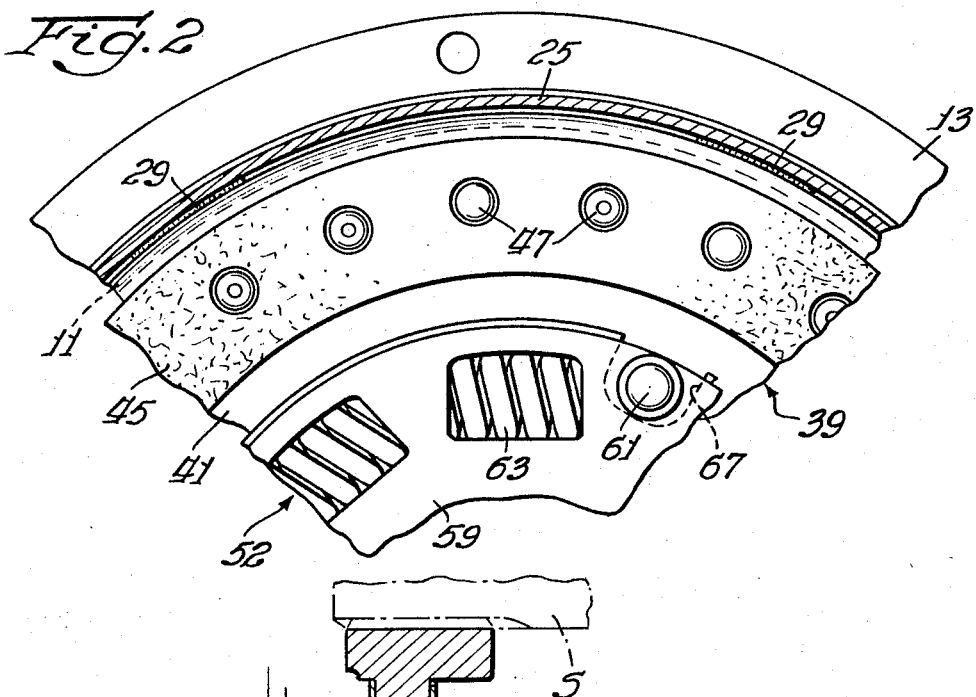
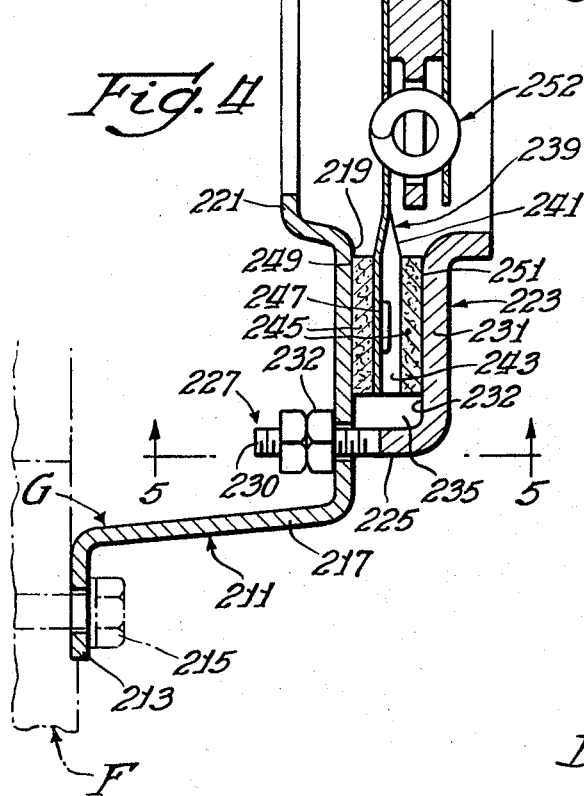
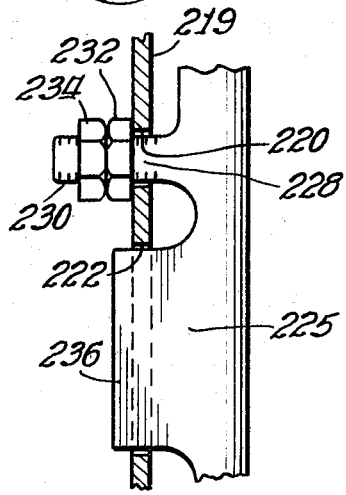
Inventor:
Byron D. Montgomery United States Patent Office 3,323,328
Patented June 6, 1967

3,323,328
TORQUE LIMITING CLUTCH
Byron D. Montgomery, Birmingham, Mich., assignor to Borg-Warner Corporation, Chicago, Ill., a corporation of Illinois
Filed Nov. 13, 1964, Ser. No. 410,984
4 Claims. (Cl. 64—30)

This invention relates to clutches. More particularly, it relates to torque limiting clutches used as a safety device to prevent overloading of a rotating drive line connected between a prime mover and a power utilization load. Further, this invention relates to a method of producing clutches of the type described.

In many applications utilizing a rotating shaft to transmit output torque from a power source to a load, it has been found desirable to limit the maximum torque which may be applied to the shaft. By maximizing the torque transmitting capacity of the system, inadvertent overloading of the drive line, which might otherwise result in serious damage to system components, is prevented.

Clutches adapted to limit the torque transmitting capacity of a rotating shaft have been produced which, upon application of an excessive torque, provide for relative slippage between operatively associated members until the magnitude of the applied torque is reduced to a value below the predetermined limit. Clutches of this type generally include a driving member secured to and rotatable with a power output shaft of a prime mover, and a driven member secured to and rotatable with a shaft connected to the load. The driven member is normally provided with a friction lining, and is frictionally engaged by a pressure plate of the driving member which is axially loaded into frictional contact with the driven member by a series of coil springs or a Belleville-type spring.

In such an arrangement the pressure plate must be movable to provide the necessary axial loading of the friction surfaces and, therefore, axial driving elements must be used to provide a driving connection between the movable pressure plate and the remainder of the driving member. As a result of this construction the clutch components require extensive and costly machining, and during use, the driving elements are subject to wear and often cause objectionable noise.

Accordingly, it is a principal object of the present invention to provide an improved form of torque limiting clutch.

It is a further object of the present invention to provide a torque limiting clutch which may be produced easily and economically.

It is a still further object of the present invention to provide a torque limiting clutch which does not require the use of an axially movable pressure plate.

A related object of the present invention is to provide a torque limiting clutch which does not require the use of driving elements providing a driving connection between an axially movable pressure plate and the remainder of the driving member.

A still further object of the present invention is to provide a torque limiting clutch which does not require the use of coil springs or a Belleville-type spring to axially load a movable pressure plate into engagement with the driven member.

It is a still further object of the present invention to provide a torque limiting clutch which accomplishes frictional engagement between a driving member and a driven member by virtue of inherent spring characteristics of one of the elements.

It is still another object of the present invention to provide a method of producing an improved torque limiting clutch incorporating various of the features of the present invention.

Further objects and advantages of the invention will become apparent with reference to the following description and the accompanying drawings.

In the drawings:

FIGURE 1 is a longitudinal sectional view of a torque limiting clutch incorporating various of the features of the present invention;

FIGURE 2 is a fragmentary sectional view taken along line 2—2 of FIGURE 1;

FIGURE 3 is a perspective view, partially in section, of a portion of the apparatus of FIGURE 1 showing various other of the features of the invention;

FIGURE 4 is a fragmentary longitudinal sectional view of an alternate form of apparatus utilizing various features of the invention;

FIGURE 5 is a fragmentary sectional view taken along the line 5—5 of FIGURE 4.

The present invention is directed to an improved torque limiting clutch which precludes the transmission of torque through a drive line system which is in excess of a predetermined value, and to a method of producing such a clutch.

An illustrated embodiment of a clutch incorporating various of the features of the invention and constructed in accordance with the associated method is shown in FIGURES 1 and 2. Referring to these figures, there is shown a torque limiting clutch C interposed between a source of power in the form of an internal combustion engine flywheel F and a load receiving member in the form of an input shaft S of a power shifting transmission of a vehicle such as, for example, a farm tractor.

While the torque limiting clutch of the illustrated embodiment is particularly adapted to be used in conjunction with the system shown, it must be appreciated that the inventive concept disclosed is equally suited to any system utilizing a rotating shaft to transmit a torque between a power source and a load. Further it should be appreciated that the particular configuration of the driving and driven members may readily be interchanged without departing from the scope of the invention.

Very generally the clutch C of the illustrated embodiment comprises a driving member G secured to and rotatable by the flywheel F and a resiliently compressible driven member N adapted to exert an opposing force in response to such compression which is secured to and rotatable with the load receiving shaft S. The driven member N is in contact with the driving member G and is retained in a compressed condition by the driving member causing the driven member to exert the opposition force upon the driving member to effect a frictionally engaged driving relaiton between them. The degree of frictional engagement achieved and consequent torque transmitting capacity of the clutch is determined by the degree of compression of the driven member and resultant opposing force obtained.

Should a torque be applied to the clutch C in excess of the capacity determined by the degree of frictional engagement, relative slipping movement between the driving and driven member occurs preventing transmission of the excessive torque to the remainder of the drive line system.

More specifically, and as best seen in FIGURES 1 and 2, the driving member G includes a mounting member 11 secured to and rotatable with the flywheel F of the power source. The mounting member 11 is provided with a generally radially directed flange 13 secured to the flywheel F by any suitable fastener such as, for example, a series of bolts 15. A generally cylindrical portion 17 extends axially from the flange 13 and supports a generally radially directed annular portion defining a surface 19 disposed in spaced relation to the flywheel F. The inner diameter of the annular portion is defined by an axial rim 21 extending toward the flywheel F which provides rigidity for the surface 19 and is sized to provide clearance for the driven member N.

A pressure plate 23 adapted to retain the driven member in a predetermined fixed compressed condition in a manner as will become apparent shortly is secured to and rotatable with the mounting member 11 of the driving member G. The pressure plate includes a generally cylindrical portion 25 having a diameter slightly greater than the diameter of the cylindrical portion 17 of the mounting member and is positioned in partially overlying relation therewith with an end 27 secured thereto as by welding generally indicated at 29.

At its opposite end, the cylindrical portion 25 of the pressure plate is provided with a generally radially extending annular portion 31 having an inner and outer surface 32 and 33. The portion 31 is disposed generally parallel to the surface 19 of the mounting member 11 and spaced a short distance therefrom to form a cavity 35 within which is positioned portions of the driven member N. The annular portion 31 is provided at its inner diameter with a rim 37 which adds structural rigidity to the surface 32 and also forms a clearance space for the driven member N.

The driven member N of the illustrated embodiment, which is best seen in FIGURE 1, is positioned coaxially with the driving member G and includes a generally radially directed, axially compressible disc 39 disposed in the cavity 35 formed between the mounting member 11 and the pressure plate 23.

The axially compressible disc 39, best seen in FIGURE 3, has an outer diameter slightly smaller than the diameter of the generally cylindrical portion 25 of the pressure plate and includes an outer annular rim 41 formed in a continuous series of radially directed corrugations 43 disposed within the cavity 35. The corrugations are axially compressible and adapted to exert an opposition force in response to such compression. The disc is made of an appropriate material, such as, for example, steel to provide the rim 41 with the necessary resilient properties to produce an opposition force upon compression.

A pair of annular ring friction linings 45 are secured to the rim 41 in overlying relation to the corrugations 43 and are held in place by rivets 47. The friction linings each include a radially directed contacting surface 49 and 51 which is in contact with the driving member along the generally radially directed annular surfaces 19 and 32 respectively of the mounting member 11 and the pressure plate 23.

The pressure plate 23 is positioned with relation to the mounting member 11 so as to retain the rim 41 of the disc 39 in a predetermined fixed axially compressed condition. This compression and resultant outward axial opposition force plates the linings 45 in frictional driving engagement with the mounting member along the surfaces 19 and 32, enabling the clutch to transmit a predetermined torsional effort.

Should a torque be applied to the clutch in excess of the amount which may be transmitted by virtue of the frictional engagement obtained, relative slippage along the surfaces 49 and 51 of the disc linings and 19 and 32 of the driving member occurs until the excessive load is removed.

The flexible disc 39 of the driven member N is secured to the load shaft S through a conventional vibration dampening element 52 which is adapted to prevent the transmission of undesirable torsional vibration initiated in the power source F to the remaining components of the drive line system.

As best seen in FIGURE 1, the vibration dampener of the illustrated embodiment includes a hub 53 secured to the load receiving shaft S by means of a series of splines 55 which allow relative axial movement of the shaft S with respect to the hub should such movement be required.

A radially directed flange 57 of the hub is interposed between the compressible disc 39 and a radially directed annular retainer plate 59 which is secured to the disc 39 in axially spaced relation as by rivets 61. A series of dampening springs 63 positioned in pockets 65 disposed about the flange 57 interconnect the hub 53 and the compressible disc 39 and plate 59 in flexible driving engagement. This arrangement provides for relative movement between the disc and the hub to effect a dampening of torsional vibration. Slots 67 are provided in the flange 57 to provide clearance for movement of the rivets 61 connected between the disc 39 and retainer plate 59.

In the assembly of the clutch of the illustrated embodiment of FIGURES 1 and 2, the outer rim corrugations 43 of the axially compressible disc 39 must be compressed to provide for frictional engagement between the driving and driven members. As it is desirable to construct the clutch so that a predetermined maximum torque may be transmitted the amount of compression of the outer rim of the flexible disc must be controlled to obtain the desired result.

Assembly of the clutch in accordance with the foregoing objectives is accomplished by connecting a clutch assembly including a driven member D and a driving member G having pressure plate 23 loosely positioned in overlying relation to the mounting member 11 but not secured at 29, between a pair of coaxial retatable shafts. In this regard, the mounting member 11 of the driving member G may be secured to a flywheel similar to the flywheel F as by dowels or the like, which flywheel is in turn, secured to a shaft connected to a torque metering apparatus. Similarly, the hub 53 may be connected by splines 55 to a correspondingly, splined shaft similar to the shaft S which is, in turn connected to a source of torsional effort. As the pressure plate is not secured to the mounting member, no axial load is imparted to the compressible disc 39 of the driven member and consequently no torque may be transmitted from the driving member to the driven member.

After positioning of the clutch as described above, a torsional effort is applied to the driven member N and simultaneously an axial force is applied to the pressure plate 23 about the outer surface 33. This force causes the pressure plate to move axially toward the mounting member 11 and compress the outer rim 41 of the flexible disc 39 within the cavity 35. As compression of the corrugations 43 of the rim 41 occurs frictional engagement of the surfaces 49 and 51 of the linings 45 and the surfaces 19 and 32 is produced causing the clutch to transmit a torque to the flywheel F connected to the torque metering apparatus. The magnitude of the load applied to the pressure plate is increased and torque transmitted to the driving member is monitored on the torque metering apparatus until a predetermined value is reached. At this point, the applied torque is removed, however, the axial load upon the pressure plate is retained to maintain the radially directed surfaces of the pressure plate and mounting member in the particular spaced apart relation which provides sufficient compression of the corrugations 43 to enable the clutch to transmit the predetermined maximum torque. The end 27 is then secured to the cylindrical surface 17 of the mounting member 11 by welding at 29 to retain the radially directed surface of the pressure plate in the spaced apart relation to the radially directed surface of mounting member so established.

Referring now to an alternate form of the invention, shown in FIGURES 4 and 5, there is shown a clutch having a driving member G, and a driven member N interposed between a power source F and a load shaft S.

The driving member G includes a mounting member 211 provided with a mounting flange 213 secured to a power source such as the flywheel F by a series of bolts 215. A generally cylindrical portion 217 extends laterally from the mounting flange 213 in a direction away from the flywheel F and terminates in a generally radially directed annular portion defining a surface 219. The inner diameter of the radially directed portion is provided with a generally cylindrical support rim 221 which adds necessary rigidity to the annular surface 219. Adjacent the outer periphery of the radially extending annular surface 219 there is provided a series of circumferentially elongated slots disposed in a circular pattern having a diameter slightly larger than the diameter of the driven member N and comprising alternately arranged relatively short slots 220 and relatively long slots 222, the function of which will become apparent shortly.

The driving member G further includes a pressure plate 223 having a generally cylindrical portion 225 having a diameter approximately equal to the diameter of the element of the slots in the surface 219. An end 227 of the pressure plate 223 is provided with a series of axially extending circumferentially elongated tabs 228 extending through the short slots 220, and providing a driving connection between the pressure plate and the mounting member. The tabs 228 are provided with screw threads 230 along radial surfaces to which are secured adjustment nuts 232 which secure the pressure plate on the mounting member. Lock nuts 234 are secured to the tabs 228 adjacent nuts 232 to prevent accidental dislodgement of the adjustment nuts.

Interposed between the tabs 228 along the end 227 are a series of alignment tabs 236 which extend axially from the cylindrical portion 217 in a manner similar to the tabs 228 and pass through the circumferentially elongated slots 222. These tabs align the pressure plate with respect to the mounting member and further provide a driving connection between the mounting member and pressure plate.

At its opposite end, the cylindrical portion of the pressure plate is provided with a generally radially extending annular portion 231 which is disposed generally parallel to the surface 219 and spaced a short distance therefrom to form a cavity 235 within which the driven member N is disposed in frictional driving engagement with the driving member G.

The driven member N of the embodiment of the invention shown in FIGURES 4 and 5 is generally similar to the driven member of the embodiment shown in FIGURES 1 and 2. It includes an axial compressible disc 239 disposed in the cavity 235 which includes an outer rim 241 formed in a continuous series of corrugations 243 which exert an axial reaction force in opposition to a compressive load. The outer rim is provided with a pair of annular ring friction linings disposed on either side of the corrugations 213 which are secured in place by rivets 247 and which include contracting surfaces 249 and 251 which are maintained in axially loaded frictional driving engagement with the annular surfaces 219 and 231 of the mounting member 211 by the axial force exerted by the disc 239.

The disc 239 is secured to the shaft S by a vibration dampener similar to the vibration dampener of FIGURES 1 and 2 which prevents the transmission of undesirable torsional vibration through the clutch to the shaft S.

The clutch of the illustrated embodiment of FIGURES 4 and 5 is assembled generally in accordance with the method described with respect to the embodiment of FIGURES 1 and 2. The mounting member 211 is secured to a rotatable shaft adapted to provide an ample source of torsional effort and the driving member G is secured to a restrained shaft connected to a torque metering apparatus. The pressure plate 223 is positioned loosely over the disc 239 of the driven member with the tabs 228 and 236 extending through the slots 220 and 222 respectively.

A torsional effort is then applied to the clutch and simultaneously an axial force is applied to the pressure plate 223 causing it to move toward the mounting member 211 and compress the disc 239 between the radially directed surfaces 219 and 231. This compression creates a frictionally engaged driving relation between these surfaces and the friction linings 245 of the driven member enabling the clutch to transmit torsional effort to the metering apparatus.

The axial load is increased until the relative spaced relation between the radially directed surfaces of the pressure plate and mounting member is such as to effect sufficient compression of the corrugations 243 to enable the clutch to transmit the desired maximum torque. When this condition is reached, the applied torsional effort is removed and the nuts 232 and 234 are positioned upon the tabs 228 to retain the pressure plate on the mounting member with the radially directed surfaces 219 and 231 in the established spaced apart relationship.

As can be seen, a novel arrangement of a torque limiting clutch has been provided which incorporates the use of a stationary pressure plate which is fixed secured to the mounting member and which takes advantage of the inherent spring characteristics of one of the members of the clutch assembly. Initial compression of the flexible disc of the driven member provides the necessary axial loading to produce frictional engagement between the driving member and the driven member to transmit a predetermined torque through the clutch assembly. When an overload condition exists, relative slippage occurs between the frictionally engaged components, thus preventing the transmission of torque in excess of the predetermined limit.

While various of the features of the invention have been particularly shown and described, it should be obvious to one skilled in the art that various modifications may be made therein without departing from the scope of the invention.

What is claimed is:

1. A clutch adapted to limit the maximum torque which may be transmitted through a drive line system comprising
    (A) a driving member adapted to transmit a torsional effort
    (B) a driven member adapted to receive transmitted torsional effort from said driving member
    (C) one of said driving and driven members including a generally radially directed disc including an axially compressible annular rim formed of a continuous series of radially extending corrugations adapted to exert an opposition force in response to such compression
        (1) said disc further including at least one friction lining secured to said corrugations in radial overlying relation thereto and having a radially directed friction surface thereon
    (D) the other one of said driving and driven members being disposed so as to contact said friction lining along said radially directed surface and being disposed so as to retain said axially compressible corrugations of said disc in a compressed condition causing said rim to exert said opposition force thereon to effect a frictionally engaged driving relation between said surface of said friction lining and said other means
    (E) the degree of frictional engagement established by said compression of said corrugations limiting the maximum torque which may be transmitted between said driving and driven members.

2. A clutch adapted to limit the maximum torque which may be transmitted through a drive line system comprising
    (A) a driving member adapted to transmit a torsional effort (B) a driven member adapted to receive transmitted torsional effort from said driving member (C) one of said driving and driven members including a generally radially directed disc including an axially compressible annular rim formed of a continuous series of radially extending corrugations adapted to exert an opposition force in response to such compression (D) the other one of said driving and driven members including a pair of generally parallel radially directed surfaces positioned in predetermined spaced apart relation so as to retain said corrugations therebetween in a compressed condition causing said rim to exert said opposition force thereon to effect a frictionally engaged driving relation between said disc and said surfaces (E) the degree of frictional engagement established by said compression of said corrugations between said surfaces limiting the maximum torque which may be transmitted between said driving and driven members.

3. A clutch adapted to limit the maximum torque which may be transmitted through a drive line system comprising (A) a driving member adapted to transmit a torsional effort (B) a driven member adapted to receive transmitted torsional effort from said driven means (C) one of said driving and driven members including a generally radially directed disc including an axially compressible annular rim formed of a continuous series of radially extending corrugations adapted to exert an opposition force in response to such compression (D) the other one of said driving and driven members including a pair of generally parallel radially directed surfaces positioned in predetermined spaced apart relation so as to retain said compressible portion therebetween in a compressed condition causing said compressible portion to exert said opposition force thereon to effect a frictionally engaged driving relation between said disc and said surfaces (1) one of said radially directed surfaces being defined by a mounting member having a generally radially directed portion and including a generally cylindrical surface extending axially in a direction away from said disc and the other of said radially directed surfaces being defined by a pressure plate having a generally radially directed portion and including a generally cylindrical portion having a diameter slightly larger than the diameter of said cylindrical portion of said mounting member extending from said radially directed portion in overlying relation to said disc and at least a portion of said cylindrical surface of said mounting member, said cylindrical surface of said pressure plate being secured to said cylindrical surface of said mounting member so as to retain said radially directed portions in said predetermined spaced apart relation (E) the degree of frictional engagement established by said compression of said compressible portion of said disc limiting the maximum torque which may be transmitted between said disc and said surfaces.

4. A clutch adapted to limit the maximum torque which may be transmitted through a drive line system comprising (A) a driving member adapted to transmit a torsional effort (B) a driven member adapted to receive transmitted torsional effort from said driving member (C) one of said driving and driven members including a generally radially directed disc including an axially compressible portion adapted to exert an opposition force in response to such compression (D) the other one of said driving and driven members including a pair of generally parallel radially directed surfaces positioned in predetermined spaced apart relation so as to retain said disc portion therebetween in a compressed condition causing said compressible portion to exert said opposition force thereon to effect a frictionally engaged driving relation between said disc and said surfaces (1) one of said radially directed surfaces being defined by a mounting member having a generally radially directed portion including a series of circumferentially directed slots extending axially therethrough disposed in a circular pattern having a diameter slightly greater than the diameter of said disc, and the other of said radially directed surfaces being defined by a pressure plate having a generally radially directed portion and including a generally cylindrical portion extending axially therefrom in overlying relation to said disc and including a series of axially extending tabs extending through said slots in said radially directed portion of said mounting member, at least a portion of said tabs including fastening means securing said pressure plate to said mounting member so as to retain said radially directed surfaces in said predetermined spaced apart relation (E) the degree of said frictional engagement established by said compression of said disc portion between said surfaces limiting the maximum torque which may be transmitted between said driving and driven members.

References Cited

UNITED STATES PATENTS

| | | | |
|---|---|---|---|
| 458,408 | 8/1891 | Schwanhausser | 64—30 |
| 755,952 | 3/1904 | Smith | 64—30 |
| 1,455,479 | 5/1923 | Daggett | 64—30 X |
| 1,693,765 | 12/1928 | Parsons et al. | 64—30 |
| 2,037,928 | 4/1936 | Saks | 192—68 X |
| 2,180,086 | 11/1939 | Kraft | 192—68 |
| 2,221,463 | 11/1940 | Wolfram | 192—68 |
| 2,296,515 | 9/1942 | Goodwin | 192—107 |
| 2,618,136 | 11/1952 | Wellauer | 64—30 X |
| 2,636,363 | 4/1953 | Nutt | 64—27 |
| 2,708,836 | 5/1955 | Stuart | 64—30 |
| 2,826,901 | 3/1958 | Barrenechea | 64—27 |

FRED C. MATTERN, JR., *Primary Examiner.*

HALL C. COE, *Examiner.*

UNITED STATES PATENT OFFICE
CERTIFICATE OF CORRECTION

Patent No. 3,323,328                                                     June 6, 1967

Byron D. Montgomery

It is hereby certified that error appears in the above numbered patent requiring correction and that the said Letters Patent should read as corrected below.

Column 7, line 28, for "driven" read -- driving --.

Signed and sealed this 13th day of August 1968.

(SEAL)
Attest:

Edward M. Fletcher, Jr.                                      EDWARD J. BRENNER
Attesting Officer                                                Commissioner of Patents